US006867946B1

(12) United States Patent
Berding et al.

(10) Patent No.: US 6,867,946 B1
(45) Date of Patent: Mar. 15, 2005

(54) DISK DRIVE EMPLOYING A SPINDLE MOTOR COMPRISING A LOCKING SPRING ARM DISENGAGED THROUGH STATOR COIL FLUX

(75) Inventors: Keith R. Berding, San Jose, CA (US); John R. Gustafson, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 325 days.

(21) Appl. No.: 10/062,837

(22) Filed: Jan. 31, 2002

(51) Int. Cl.[7] ............... G11B 17/02; F16D 65/36
(52) U.S. Cl. ............ 360/99.08; 188/156; 310/77; 310/93
(58) Field of Search .................. 188/156, 161, 188/163, 157, 158, 159; 360/99.08, 99.04, 98.07, 97.01, 88; 369/266, 269, 258, 264, 232, 258.1; 310/76, 77, 93, 92; 720/695, 698

(56) References Cited

U.S. PATENT DOCUMENTS 3,626,220 A * 12/1971 Niculescu .................. 310/77
5,157,566 A    10/1992 Hishikawa et al.
5,306,989 A *  4/1994 Feller, Jr. .................. 318/372
5,572,505 A    11/1996 Llewellyn
6,177,748 B1 *  1/2001 Katcher et al. ............. 310/209

FOREIGN PATENT DOCUMENTS

JP       57-13943 A   *  1/1982
JP    2001-273744 A   * 10/2001

* cited by examiner

Primary Examiner—Julie Anne Watko
(74) Attorney, Agent, or Firm—Won Tae C. Kim, Esq.; Milad G. Shara, Esq.; Howard H. Sheerin, Esq.

(57) ABSTRACT

A disk drive is disclosed comprising a disk, a head actuated radially over the disk, and a spindle motor for rotating the disk. The spindle motor comprises a stator having at least one stator coil wrapped around a stator tooth. The spindle motor further comprises a hub rotated by the stator when current is applied to the stator coil, and a locking spring arm having a fixed base. The locking spring arm engages the hub when no current is applied to the stator coil, and the locking spring arm disengages from the hub when current applied to the stator coil generates a magnetic flux which pulls the locking spring arm away from the hub.

12 Claims, 6 Drawing Sheets

DISK DRIVE EMPLOYING A SPINDLE MOTOR COMPRISING A LOCKING SPRING ARM DISENGAGED THROUGH STATOR COIL FLUX

BACKGROUND OF THE INVENTION

1. Field of the Invention

The present invention relates to disk drives. More particularly, the present invention relates to a disk drive employing a spindle motor comprising a locking spring arm disengaged through stator coil flux.

2. Description of the Prior Art

The spindle motor within a disk drive typically employs high accuracy, low noise spindle bearings encased in lubricating and anti-rust oils. During shipping, vibrations may cause the spindle bearings to oscillate in small back and forth motions causing the bearings to push through the lubricating and anti-rust oils until there is metal-on-metal contact. The metal-on-metal contact creates micro spots of fretting corrosion which exacerbates acoustic noise and non-repeatable run-out NRRO).

There is, therefore, a need for a disk drive which minimizes metal-on-metal contact of the spindle bearings due to vibrations during shipping.

SUMMARY OF THE INVENTION

The present invention may be regarded as a disk drive comprising a disk, a head actuated radially over the disk, and a spindle motor for rotating the disk. The spindle motor comprises a stator comprising at least one stator coil wrapped around a stator tooth. The spindle motor further comprises a hub rotated by the stator when current is applied to the stator coils, and a locking spring arm having a fixed base. The locking spring arm engages the hub when no current is applied to the stator coil, and the locking spring arm disengages from the hub when current applied to the stator coil generates a magnetic flux which pulls the locking spring arm away from the hub.

In one embodiment, the locking spring arm comprises a magnetic material for interacting with the magnetic flux. In another embodiment, the locking spring arm comprises a rubber material for engaging the hub. In one embodiment, the locking spring arm comprises a spring material for biasing the locking spring arm toward the hub. In yet another embodiment, the locking spring arm is non-elastic so that the locking spring arm remains disengaged from the hub when the current applied to the stator coil is turned off. In one embodiment, the locking: spring arm comprises a substantially arcuate shape corresponding to an arcuate shape of the spindle motor, and in an alternative embodiment, the locking spring arm comprises a substantially circular shape corresponding to a circular shape of the spindle motor.

The present invention may also be regarded as a spindle motor comprising a stator having at least one stator coil wrapped around a stator tooth. The spindle motor further comprises a hub rotated by the stator when current is applied to the stator coil, and a locking spring arm having a fixed base. The locking spring arm engages the hub when no current is applied to the stator coil, and the lock ing spring arm disengages from the hub when current applied to the stator coil generates a magnetic flux which pulls the locking spring arm away from the hub.

DESCRIPTION OF THE PREFERRED EMBODIMENTS

Figure 1:
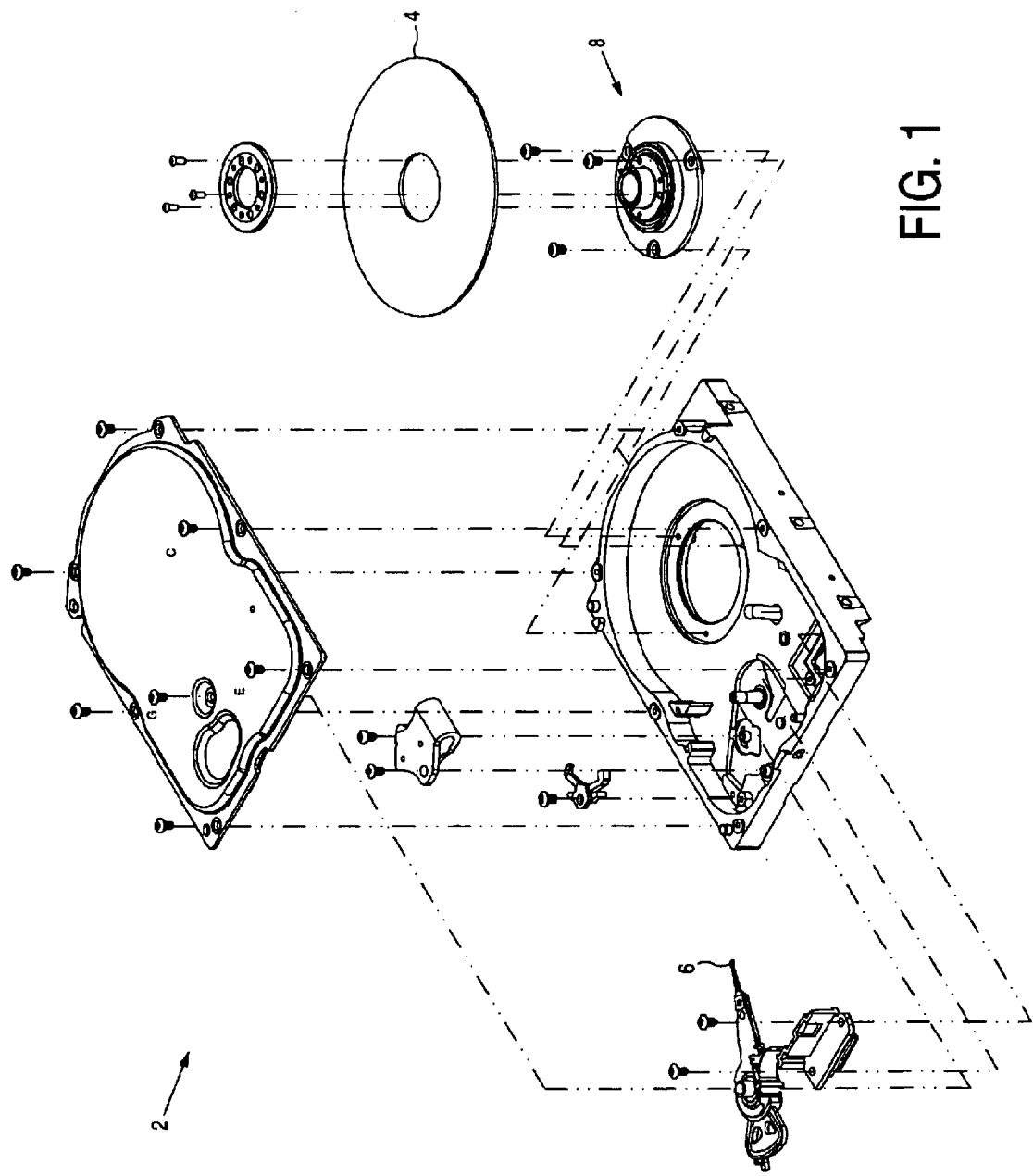
FIG. 1 is an exploded view of a disk drive according to an embodiment of the present invention comprising a disk, a head actuated radially over the disk, and a spindle motor for rotating the disk.

FIG. 1 is an exploded view of a disk drive 2 according to an embodiment of the present invention comprising a disk 4, a head 6 actuated radially over the disk 4, and a spindle motor 8 for rotating the disk 4. As shown in the cross-sectional view of FIG. 2A, the spindle motor 8 comprises a stator 10 having at least one stator coil 14A wrapped around a stator tooth 12A. The spindle motor 8 further comprises a hub 16 rotated by the stator 10 when current is applied to the stator coils, and a locking spring arm 18 having a fixed base. The locking spring arm 18 engages the hub 16 when no current is applied to the stator coil 14A, and the locking spring arm 18 disengages from the hub 16 when current applied to the stator coil 14A generates a magnetic flux which pulls the locking spring arm 18 away from the hub 16.

Figure 2A:
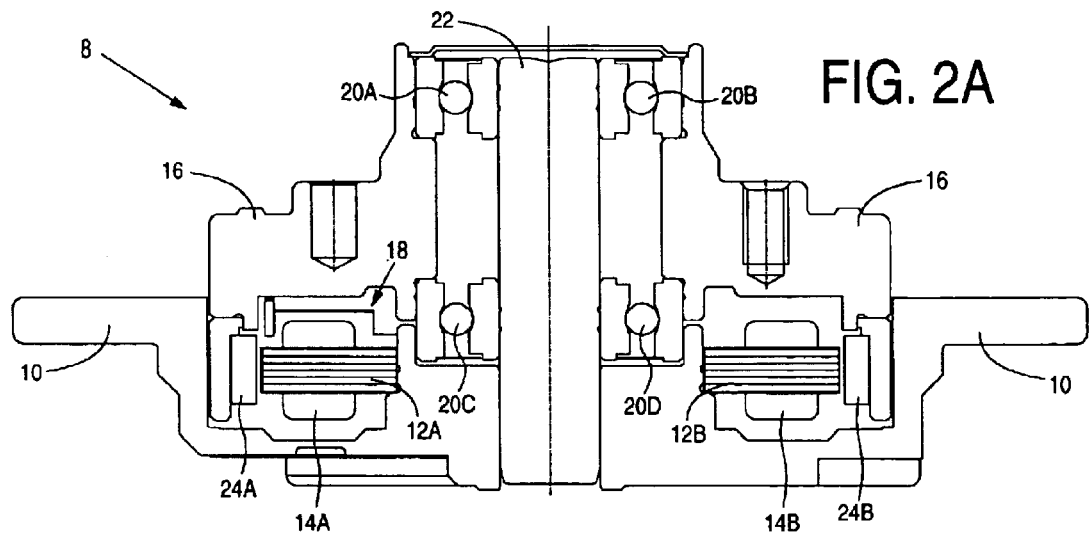
FIG. 2A is a cross-sectional view of the spindle motor in the disk drive of FIG. 1, including a locking spring arm for restraining movement of a hub during shipping and disengaged when current is applied to a stator coil of the spindle motor.

In the embodiment of FIG. 2A, the spindle motor 8 comprises bearings 20A–20D encased in lubricating and anti-rust oils. The bearings 20A–20D allow the hub 16 to rotate around a fixed spindle shaft 22. The hub 16 comprises magnets 24A and 24B which interact with the flux generated by the stator coils 14A and 14B to generate the torque which rotates the hub 16 around the spindle shaft 22. The flux that rotates the hub 16 also interacts with the locking spring arm 18. During shipping, no current is applied to the stator coils and therefore the locking spring arm 18 engages the hub 16 to prevent it from rotating. This helps prevent the bearings 20A–20D from pushing through the lubricating and anti-rust oils, thereby avoiding the metal-on-metal contact that can exacerbate acoustic noise and non-repeatable run-out (NRRO). When the disk drive is powered on and current is applied to the stator coils in order to spin up the disk 4, the flux generated by the stator coils pulls the locking spring arm 18 away from the hub 16 allowing the disk 4 to rotate freely.

The current applied to the stator coils is increased during the spin up process since it requires more torque to accelerate the disk 4 than to maintain the disk 4 at the operating speed. Accordingly, more flux is generated during the spin up process to help pull the locking spring arm 18 away from the hub 16. Once pulled away, less flux is needed to maintain the locking spring arm 18 in the disengaged positioned.

Figure 2B:
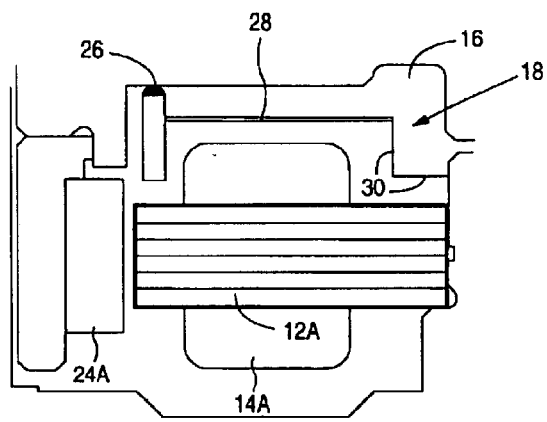
FIG. 2B shows further details of the locking spring arm, including a rubber material for engaging the hub.

FIG. 2B shows the locking spring arm 18 engaging the hub 16 during shipping to prevent the hub 16 from rotating. In this embodiment, the locking spring arm 18 comprises a rubber material 26 for engaging the hub 16. The surface of the rubber material 26 provides a high friction coefficient so that it "sticks" to the surface of the hub 16. In this embodiment, the locking spring arm comprises a magnetic material 28 which interacts with the flux generated by the stator coil 12A. The magnetic material 28 is suspended by a spring material 30 comprised, for example, of metal or plastic which is attached to the stator 10 and biases the rubber material 26 toward the hub 16.

Figure 2C:
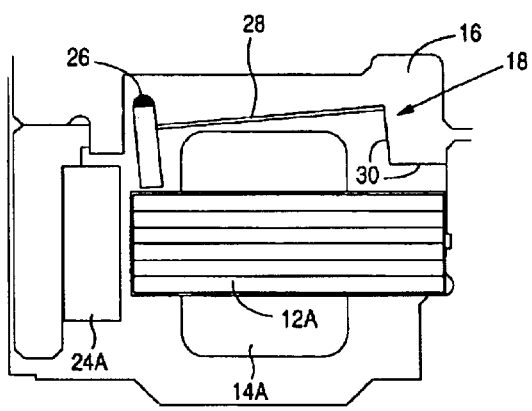
FIG. 2C illustrates how the locking spring arm disengages from the hub when current is applied to the stator coil.

FIG. 2C illustrates operation of the locking spring arm 18 when the disk drive 2 is powered on and current is applied to the stator coils in order to spin up the disk 4. The flux generated by the stator coils pulls the locking spring arm 18 away from the hub 16 allowing it to rotate freely. In one embodiment, when the current applied to the stator coil 12A is turned off the elasticity of the spring material 30 repositions the locking spring arm 18 so that it engages the hub 16 as shown in FIG. 2B. In an alternative embodiment, the spring material 30 is non-elastic so that the locking spring arm 18 remains disengaged from the hub 16 when the current applied to the stator coil 12A is turned off.

Figure 3A:
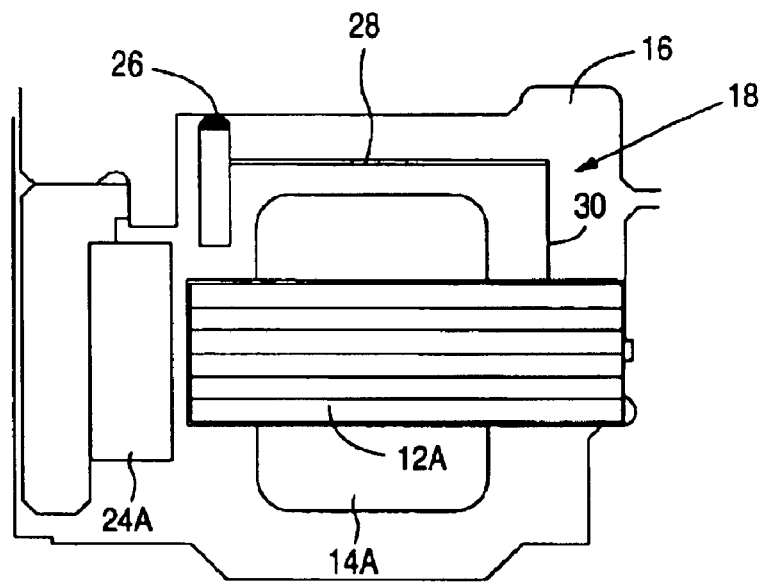
FIG. 3A shows an embodiment of the present invention wherein the base of the locking spring arm is connected to a lamination of the stator.
Figure 3B:
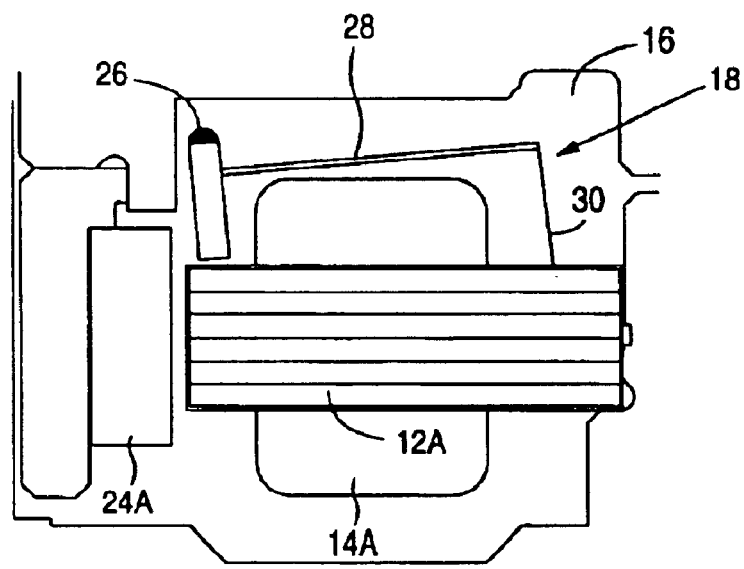
FIG. 3B illustrates the flux from the stator coils pulling the locking spring arm away from the hub when current is applied to the stator coils.

In the embodiment of FIG. 2B, the spring material 30 comprises a ninety degree angle and is connected to a bracket portion of the stator 10, however, the spring material 30 may comprise any suitable shape and may be fixed to anything suitable, such as another part of the stator 10 or even the spindle shaft 22. In the embodiment shown in FIG. 3A, the spring material 30 is connected to one or more of the stator teeth 12A with FIG. 3B illustrating the disengaged position of the locking spring arm 18.

Figure 4A:
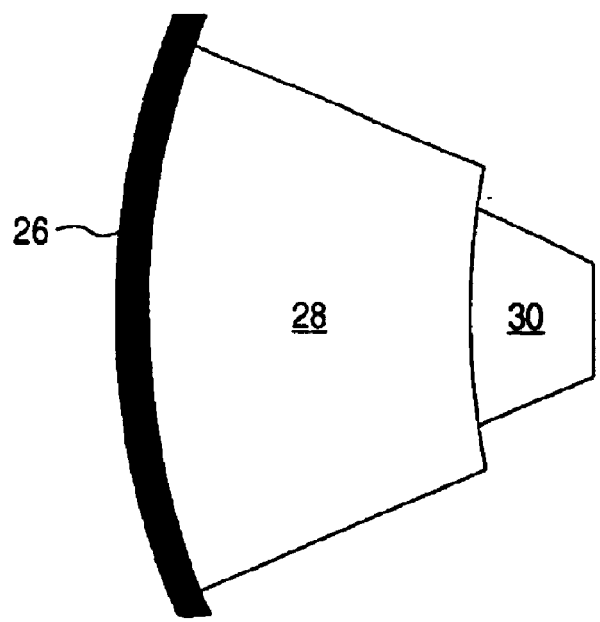
FIG. 4A shows a top view of a locking spring arm according to an embodiment of the present invention comprising a substantially arcuate shape corresponding to an arcuate shape of the spindle motor.
Figure 4B:
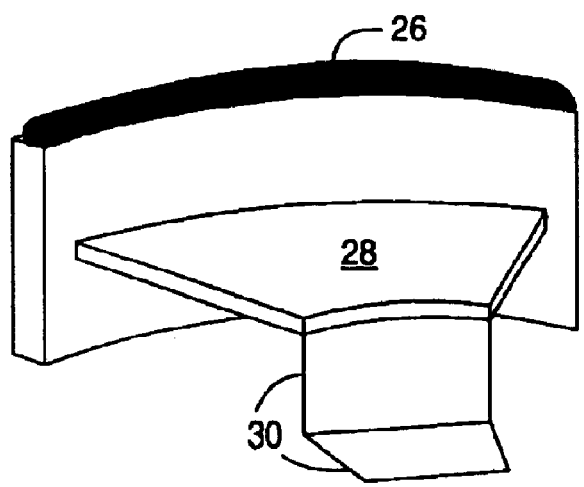
FIG. 4B shows a perspective view of the locking spring arm of FIG. 4A.
Figure 5A:
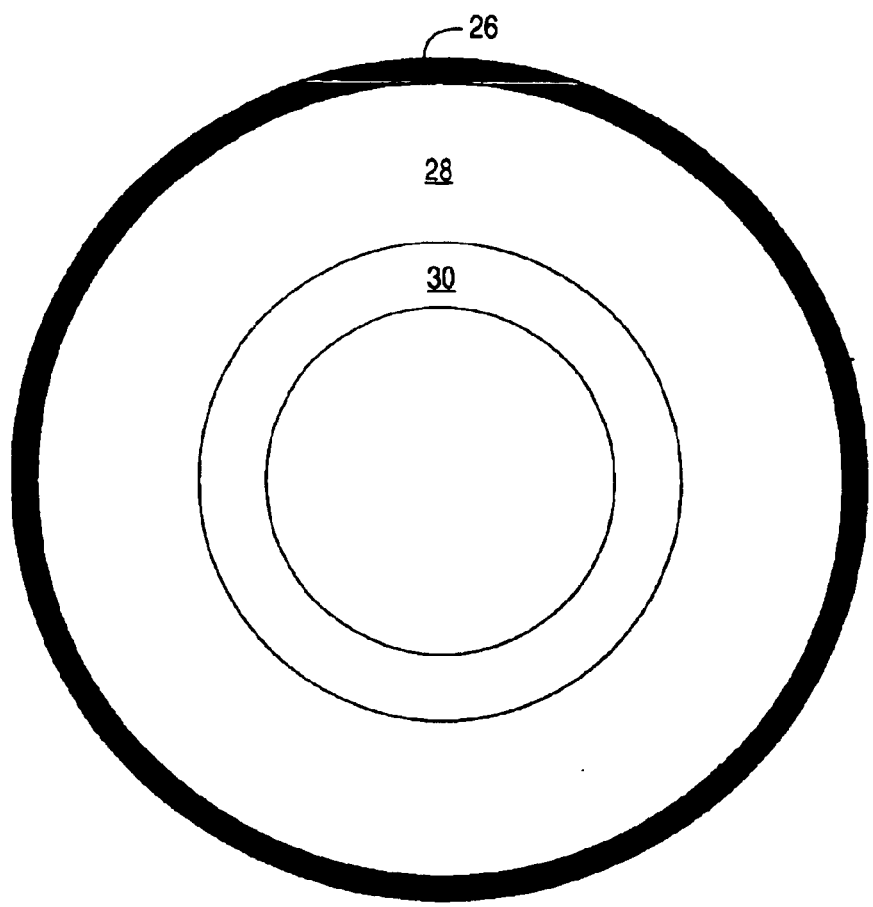
FIG. 5A shows a top view of a locking spring arm according to an embodiment: of the present invention comprising a substantially circular shape corresponding to a circular shape of the spindle motor.
Figure 5B:
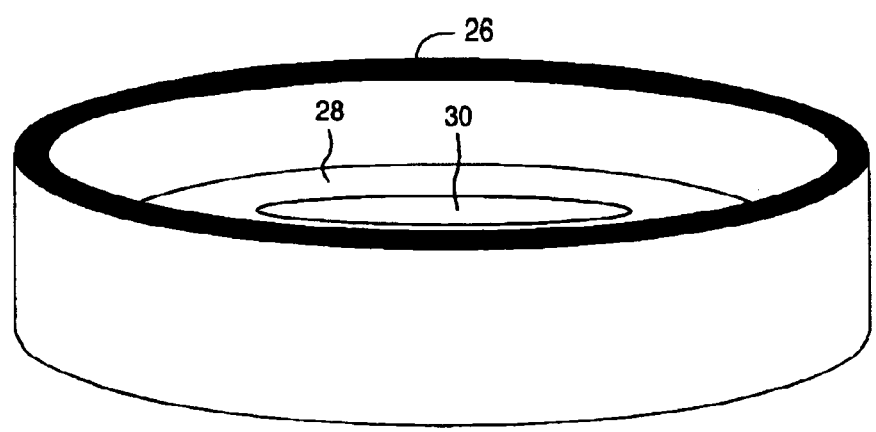
FIG. 5B shows a perspective view of the locking spring arm of FIG. 5A.
Figure 6A:
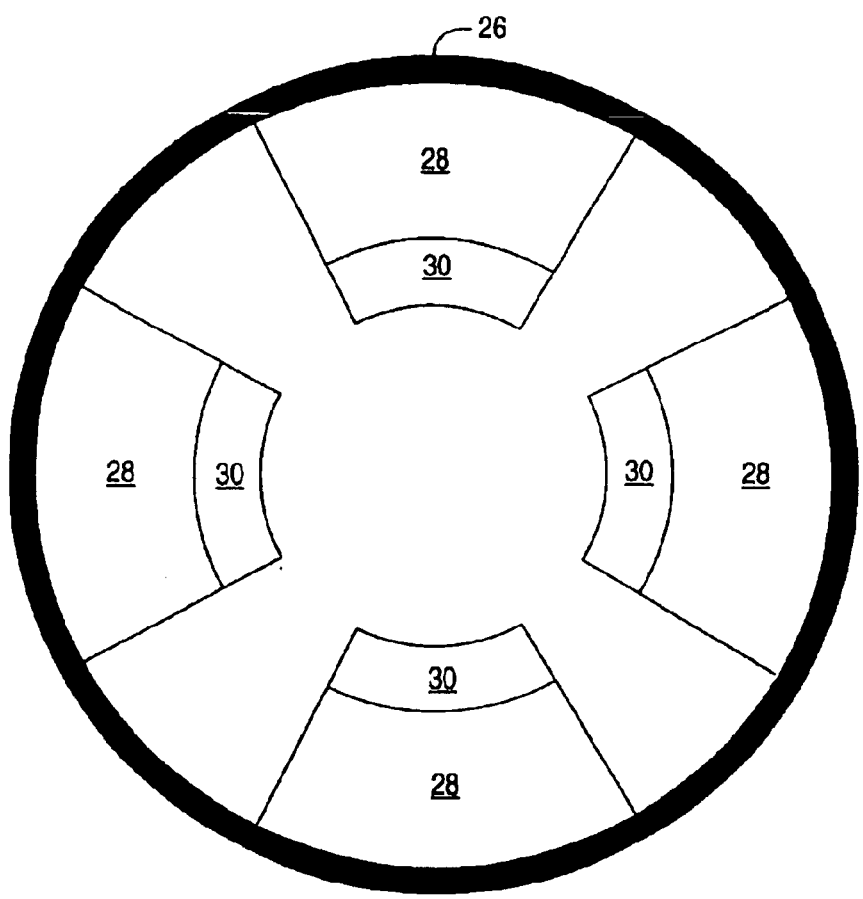
FIG. 6A shows a top view of a locking spring arm according to an embodiment of the present invention comprising a spoke and wheel configuration.
Figure 6B:
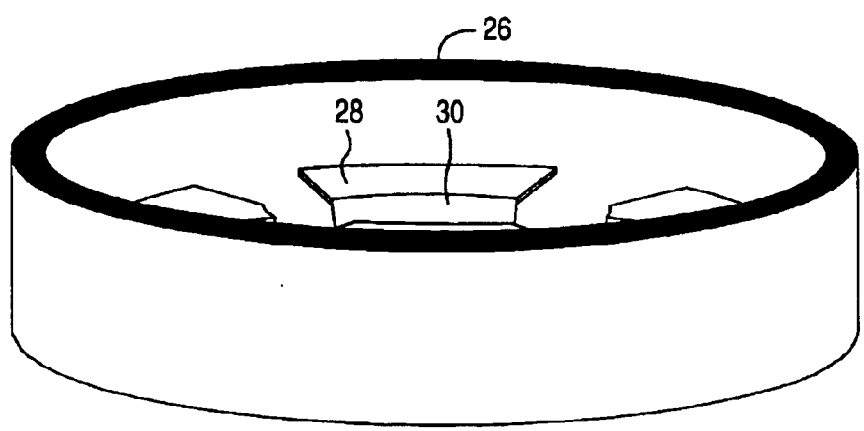
FIG. 6B shows a perspective view of the locking spring arm of FIG. 6A.

The locking spring arm 18 may comprise any suitable shape. FIG. 4A shows a locking spring arm according to an embodiment of the present invention comprising a substantially arcuate shape corresponding to an acruate shape of the spindle motor 8. FIG. 4B shows a perspective view of the locking spring arm of FIG. 4A. FIG. 5A shows a top view of a locking spring arm according to an embodiment of the present invention comprising a substantially circular shape corresponding to a circular shape of the spindle motor 8. FIG. 5B shows a perspective view of the locking spring arm of FIG. 5A. FIG. 6A shows a top view of a locking spring arm according to an embodiment of the present invention comprising a spoke and wheel configuration. FIG. 6B shows a perspective view of the locking spring arm of FIG. 6A.

In one embodiment, the shape of the locking spring arm 18 is selected so that it interacts with the magnetic flux generated by a plurality of the stator coils. In this manner the locking spring arm 18 is continuously affected by magnetic flux which pulls it away from the hub 16 even though the stator coils may be activated according to a commutation sequence. For example, if the spindle motor 8 of FIG. 1 is a three phase spindle motor, the shape of the locking spring arm 18 may be selected so that it is affected by at least three of the stator coils, two of which are active at any given time. In an alternative embodiment, the shape of the locking spring arm 18 is selected so that it is affected by a single stator coil. This embodiment will maintain the locking spring arm 18 in the disengaged position as long as there is adequate coil current at a suitable switching frequency for the commutation sequence relative to the mechanical response of the locking spring arm 18.

We claim:

1. A disk drive comprising:
   (a) a disk;
   (b) a head actuated radially over the disk; and
   (c) a spindle motor for rotating the disk, the spindle motor comprising:
      a stator comprising at least one stator coil wrapped around a stator tooth;
      a hub rotated by the stator when current is applied to the stator coil; and
      a locking spring arm having a fixed base, wherein:
         the locking spring arm engages the hub when no current is applied to the stator coil; and
         the locking spring arm disengages from the hub when current applied to the stator coil generates a magnetic flux which pulls the locking spring arm away from the hub.

2. The disk drive as recited in claim 1, wherein the locking spring arm comprises a magnetic material for interacting with the magnetic flux.

3. The disk drive as recited in claim 1, wherein the locking spring arm comprises a rubber material for engaging the hub.

4. The disk drive as recited in claim 1, wherein the locking spring arm comprises a spring material for biasing the locking spring arm toward the hub.

5. The disk drive as recited in claim 1, wherein the locking spring arm comprises a substantially arcuate shape corresponding to an arcuate shape of the spindle motor.

6. The disk drive as recited in claim 1, wherein the locking spring arm comprises a substantially circular shape corresponding to a circular shape of the spindle motor.

7. A spindle motor for use in rotating a disk in a disk drive, the spindle motor comprising:
   (a) a stator comprising at least one stator coil wrapped around a stator tooth;
   (b) a hub rotated by the stator when current is applied to the stator coil; and
   (c) a locking spring arm having a fixed base, wherein:
      the locking spring arm engages the hub when no current is applied to the stator coil; and
      the locking spring arm disengages from the hub when current applied to the stator coil generates a magnetic flux which pulls the locking spring arm away from the hub.

8. The spindle motor as recited in claim 7, wherein the locking spring arm comprises a magnetic material for interacting with the magnetic flux.

9. The spindle motor as recited in claim 7, wherein the locking spring arm comprises a rubber material for engaging the hub.

10. The spindle motor as recited in claim 7, wherein the locking spring arm comprises a spring material for biasing the locking spring arm toward the hub.

11. The spindle motor as recited in claim 7, wherein the locking spring arm comprises a substantially arcuate shape corresponding to an arcuate shape of the spindle motor.

12. The spindle motor as recited in claim 7 wherein the locking spring arm comprises a substantially circular shape corresponding to a circular shape of the spindle motor.

* * * * *